(12) United States Patent
  Moore (10) Patent No.: US 11,535,371 B2
(45) Date of Patent: Dec. 27, 2022

(54) WING TILT ACTUATION SYSTEM FOR ELECTRIC VERTICAL TAKE-OFF AND LANDING (VTOL) AIRCRAFT

(71) Applicant: AMSL Innovations Pty Ltd, Stanmore (AU)

(72) Inventor: Andrew Dudley Moore, Stanmore (AU)

(73) Assignee: AMSL Innovations Pty Ltd, Stanmore (AU)

( * ) Notice: Subject to any disclaimer, the term of this patent is extended or adjusted under 35 U.S.C. 154(b) by 113 days.

(21) Appl. No.: 16/647,824

(22) PCT Filed: Sep. 6, 2018

(86) PCT No.: PCT/AU2018/050962
§ 371 (c)(1),
(2) Date: Mar. 16, 2020

(87) PCT Pub. No.: WO2019/056052
PCT Pub. Date: Mar. 28, 2019

(65) Prior Publication Data
US 2020/0231277 A1    Jul. 23, 2020

(30) Foreign Application Priority Data

Sep. 22, 2017 (AU) .............................. 2017903864
Oct. 6, 2017 (AU) .............................. 2017904036
Apr. 6, 2018 (AU) .............................. 2018901154

(51) Int. Cl.
*B64C 29/00* (2006.01)
*B64C 3/38* (2006.01)
(Continued)

(52) U.S. Cl.
CPC .......... *B64C 29/0033* (2013.01); *B60L 15/20* (2013.01); *B64C 3/38* (2013.01);
(Continued)

(58) Field of Classification Search
CPC ..... B64C 29/0033; B64C 39/068; B64C 9/28; B64D 27/24
See application file for complete search history.

(56) References Cited

U.S. PATENT DOCUMENTS 3,181,810 A   5/1965   Olson
5,046,684 A   9/1991   Wolkevitch
(Continued)

FOREIGN PATENT DOCUMENTS

WO   WO-2007-014531        2/2007
WO   WO-2015143098 A2 *   9/2015 ............. B64D 27/08

OTHER PUBLICATIONS

International Search Report for PCT/AU2018/050962, dated Oct. 16, 2018.
(Continued)

*Primary Examiner* — Timothy D Collins
*Assistant Examiner* — Justin Michael Heston
(74) *Attorney, Agent, or Firm* — Nixon Peabody LLP; Jeffrey L. Costellia (57) ABSTRACT

A vertical take-off and landing (VTOL) aircraft (10) includes a fuselage and first and second forward wings (20, 22), each wing (20, 22) having a fixed leading edge and a trailing control surface (50) which is pivotal about a generally horizontal pivot axis. The aircraft (10) includes first and second electric motors (60) each having rotors (70), the electric rotors (70) being pivotal with the trailing control surface (50) between a first position in which each rotor (70) has a generally vertical axis of rotation, and a second position in which each rotor (70) has a generally horizontal axis of rotation, a control system (90) is configured to selectively operate the first electric motor (60) and the
(Continued)

second electric motor (60) at different rotational speeds to generate a turning moment to pivot the control surface (50) about the pivot axis (33).

11 Claims, 11 Drawing Sheets

(51) Int. Cl.
    *B64C 9/16*     (2006.01)
    *B64C 27/52*     (2006.01)
    *B64C 39/06*     (2006.01)
    *B64D 27/24*     (2006.01)
    *B64C 9/00*     (2006.01)
    *B64C 27/80*     (2006.01)
    *B64C 27/82*     (2006.01)
    *B60L 15/20*     (2006.01)
    *B64C 13/00*     (2006.01)
(52) U.S. Cl.
    CPC .............. *B64C 9/00* (2013.01); *B64C 9/16* (2013.01); *B64C 13/00* (2013.01); *B64C 27/52* (2013.01); *B64C 27/80* (2013.01); *B64C 27/82* (2013.01); *B64C 39/068* (2013.01); *B64D 27/24* (2013.01); *B60L 2200/10* (2013.01); *B64C 2027/8227* (2013.01)

(56) References Cited

U.S. PATENT DOCUMENTS

| | | |
|---|---|---|
| 2006/0032970 A1 | 2/2006 | Allen |
| 2011/0042509 A1 | 2/2011 | Bevirt et al. |
| 2015/0175260 A1 | 6/2015 | Hesselbarth |
| 2015/0266571 A1 | 9/2015 | Bevirt et al. |
| 2016/0200436 A1* | 7/2016 | North ............... B64C 25/52 244/7 R |
| 2016/0288903 A1* | 10/2016 | Rothhaar ............ B64C 29/0033 |
| 2016/0311522 A1 | 10/2016 | Wiegand |

OTHER PUBLICATIONS

Response to Written Opinion for PCT/AU2018/050962.
Preliminary Report on Patentability for PCT/AU2018/050962, dated Apr. 23, 2019.

* cited by examiner

WING TILT ACTUATION SYSTEM FOR ELECTRIC VERTICAL TAKE-OFF AND LANDING (VTOL) AIRCRAFT

TECHNICAL FIELD

The present disclosure relates to a wing tilt actuation system for electric vertical take-off and landing (VTOL) aircraft. In particular, the present invention relates to a wing tilt actuation system and mechanism for electric VTOL aircraft having passenger and/or military applications.

BACKGROUND OF THE INVENTION

VTOL aircraft are capable of take-off and landing vertically, or at some angle which is close to vertical. This style of aircraft includes helicopters and certain fixed wing aircraft, often used for military applications. Advantageously, VTOL aircraft permit take-off and landing in limited spaces, which negates the need for a large runway, and permits take-off and landing in small spaces and such as boat decks and landing pads on buildings and other structures.

Helicopters are a style of aircraft in which lift and thrust are both provided by rotors. There are several issues associated with helicopters which may be problematic in some applications, such as the high levels of noise output. One such disadvantage associated with helicopters concerns the rotor design which is critical for flight. There is generally no redundancy in the design, meaning that operation of the (or each) rotor is critical. This lack of redundancy dictates that large factors of safety must be applied to all components of the rotor and drive train, which adds considerably to the weight and manufacture cost of helicopters.

Electric aircraft are of increasing interest for various commercial and safety reasons. In recent years there has been a large amount of development with respect to drone technologies, which generally utilise a plurality of electric rotors spaced around a pitch circle diameter. Drones generally operate with the electric rotors each rotating about an axis which is generally vertical.

Whist drones are becoming commercially viable for delivering small payloads, they are generally limited to relatively low flight speeds, on account of the vertical axis of rotation of the rotors. Furthermore, they tend to have reasonably low ranges of travel per battery charge.

Tilt wing aircraft are available and generally operate on the principle of a vertical propeller axis for take-off and landing, and the wings are configured to tilt between a configuration in which the propellers have vertical axes for take-off and landing, and a configuration in which the propellers have horizontal axes for forward flight.

The above noted tilt wing arrangement provides the advantage of take-off and landing in areas with limited available clear space, such as aircraft carriers and landing pads. In addition, tilt wing aircraft are able to provide flight speed comparable with conventional propeller driven fixed wing planes.

Tilt wing aircraft generally have electric motors or gas turbine engines which drive propellers or ducted fans directly mounted to the wing. The entire wing rotates between vertical and horizontal to tilt the thrust vector from vertical to horizontal and return.

By way of definition, the "Thrust line" also referred to as the "thrust vector" is the thrust force of the propeller and is approximately the same as axis of rotation of the propeller. The "hinge line" is the axis of the hinge rotation.

There are several inherent disadvantages with existing tilt wing aircraft. One disadvantage concerns the actuators and bearings or other such mechanisms required to control the angle of inclination of the wing between the take-off/landing configuration and the forward flight configuration. The actuators may also serve to lock the wing at the desired inclination during forward flight. However, in practice, the actuators and bearings add significant weight to the aircraft. This results in a reduction of the amount of payload such as personnel or cargo that can be transported. Furthermore, because of the critical nature of the wing tilt actuation system and bearings, that assembly must be designed with a sufficient degree of redundancy to reduce the risk of catastrophic failure.

An electric VTOL jet is currently being designed and tested by Lilium Aviation, under the brand Lilium Jet™. That prototype is intended as a lightweight commuter aircraft for two passengers having two wings and around 36 electric motors.

A disadvantage of the Lilium Jet™ type aircraft concerns the electric motors which are encased fan type motors. This arrangement is highly energy intensive, resulting in reduced possible flight range for a given battery size.

Furthermore, the encased fans can only be operated for take-off and landing on hardstand surfaces, such as designated landing pads and runways. This limits the usability of the aircraft, and prevents it from being operated during take-off and landing on non-hardstand surfaces, such as parks, fields and gardens. For military applications, this is undesirable, and does not cater for impromptu landings in remote locations.

Another concept VTOL aircraft is the S2 electric™ by Joby Aviation. This design has fixed wings with a plurality of electric motors, preferably four, mounted to each wing. Four additional motors are mounted to the rear stabiliser or tail. A disadvantage of this concept aircraft is that each electric motor is independently actuated, requiring a separate actuator for each motor. As noted above, this requires significant additional weight for the actuation motor system.

Another concept VTOL aircraft is the ElectronFlight™ tilt rotor system. This system has two fixed wings with vertical axis motors permanently mounted both on the leading and trailing sides of each wing. Furthermore, an outer portion of each wing has a pivoting panel on which two rotors are mounted. The rotors are actuated by differential thrust, which negates the need for a dedicated actuation system.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a vertical take-off and landing (VTOL) aircraft comprising:
a fuselage;
first and second forward wings mounted to opposing sides of the fuselage, each wing having a fixed leading edge and a trailing control surface which is pivotal about a generally horizontal pivot axis;
first and second electric motors each having rotors, the motors being mounted to each wing, the electric rotors being pivotal with the trailing control surface between a first position in which each rotor has a generally vertical axis of rotation, and a second position in which each rotor has a generally horizontal axis of rotation, a control system for controlling each motor;

wherein the control system is configured to selectively operate the first electric motor and the second electric motor at different rotational speeds to generate a turning moment to pivot the control surface about the pivot axis.

A thrust line of the first electric motor is preferably angularly offset relative to a thrust line of the second electric motor.

The first electric motor preferably has a rotor located above the control surface, and the second electric motor has a rotor located below the control surface, such that a thrust line of the first electric motor is generally parallel to and offset relative to a thrust line of the second electric motor.

The first motor is preferably operated by the control system at a higher rotational speed than the second motor responsive to a command to move the control surface between the first position and the second position, further wherein the first motor is operated by the control system at a lower rotational speed than the second motor responsive to a command to move the control surface between the second position and the first position.

In one embodiment, each wing has at least two electric motors each having rotors, the rotors being arranged in pairs having thrust lines which cancel any turning moment when the pair of motors rotate at generally equal rotation rates.

In one embodiment, each wing has two rotors, with smaller actuators to provide redundancy.

In a hovering mode, the control system is preferably configured to rotate each motor at a suitable speed to generate a combined thrust force of all motors equal to a total aircraft and payload mass multiplied by gravitational acceleration.

The vertical take-off and landing (VTOL) aircraft further preferably includes a brake, small actuator or clamping device to hold the control surface in the desired first and second positions.

The brake, small actuator or clamping device is preferably operated by the control system.

The vertical take-off and landing (VTOL) aircraft further preferably comprises first and second rearward wings mounted to opposing sides of the fuselage, wherein a distal portion of each forward wing, furthest from the fuselage, is connected to a distal portion of the adjacent rearward wing with a connecting member, defining a boxed wing structure.

In a second aspect, the present invention provides a vertical take-off and landing (VTOL) aircraft comprising:

a fuselage;

first and second forward wings mounted to opposing sides of the fuselage, each wing having a fixed leading edge and a trailing control surface which is pivotal about a generally horizontal pivot axis;

a first electric motor having a first variable pitch propeller, a second electric motor having a second variable pitch propeller, the first and second motors being mounted to each wing, the first and second propellers being pivotal with the trailing control surface between a first position in which each propeller has a generally vertical axis of rotation, and a second position in which each propeller has a generally horizontal axis of rotation, a control system for controlling rotation speed and/or blade pitch each variable pitch propeller;

wherein the control system is configured to change the pitch of the first propeller relative to the second propeller to generate a turning moment to pivot the control surface about the pivot axis.

The motors are preferably brushless DC motors which change speed responsive to changing switching frequency from electronic speed controllers of the control system.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

A vertical take-off and landing (VTOL) aircraft 10 is disclosed. In the preferred embodiment, as depicted in the drawings, there are two pairs of wings. Namely, the forward wings 20, 22 and the rearward wings 30, 32. Each of the forward wings 20, 22 is attached to a laterally opposing region of the fuselage 24. Similarly, each of the rearward wings 30, 32 is attached to a laterally opposing region of the fuselage 24. In the embodiment shown in the drawings, the aircraft 10 is depicted as a single seat aircraft 10. However, larger multi-person embodiments are envisaged.

In the embodiment shown in the drawings, distal portions of the forward wings 20, 22 and the rearward wings 30, 32 are connected, such that the two pairs of wings 20, 22, 30, 32 define a boxed wing or closed wing structure.

In another embodiment (not shown), the forward wings 20, 22 and the rearward wings 30, 32 may be strut braced wings, connected with tie bars or struts. A strut braced wing is generally lighter than a conventional cantilevered wing.

Whilst the VTOL aircraft 10 described herein is a boxed wing or strut braced aircraft 10, it will be appreciated by those skilled in the art that the aircraft 10 may be a conventional cantilevered wing aircraft in which the forward wings 20, 22 and the rearward wings 30, 32 are separate and not interconnected. Furthermore, the aircraft 10 may have only a single pair of wings.

Referring to the figures, the forward wings 20, 22 and the rearward wings 30, 32 are vertically separated.

Figure 2:
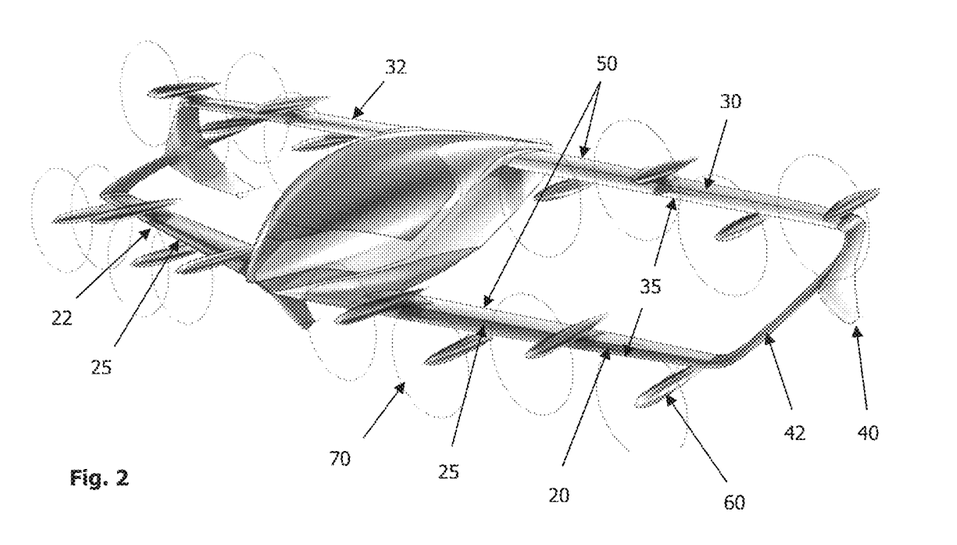
FIG. 2 is a schematic diagram depicting the VTOL aircraft of FIG. 1 in a second, forward flight configuration.
Figure 3:
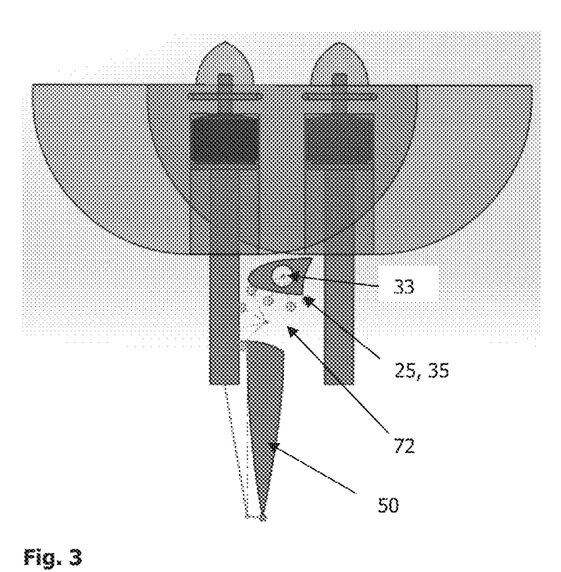
FIG. 3 is a schematic showing a mounting arrangement for mounting an electric motor to a wing of the aircraft of FIGS. 1 and 2 in a vertical (take-off and landing) rotor position.
Figure 4:
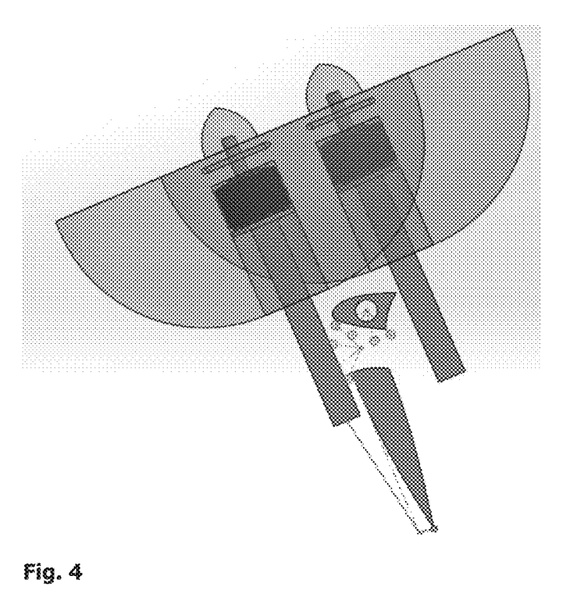
FIG. 4 is a further schematic view of the arrangement of FIG. 3 with the rotor in a partially inclined position.
Figure 5:
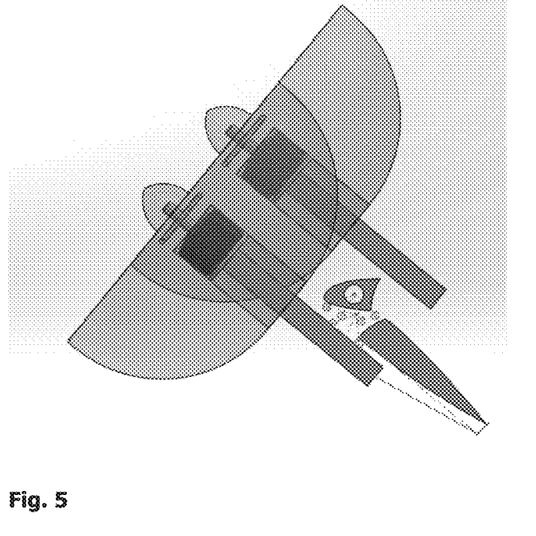
FIG. 5 is a further schematic view of the arrangement of FIG. 3 with the rotor in a further inclined position.

As depicted in FIG. 2, the tip portion 40 of the rearward wings 30, 32 extends downwardly and rearwardly. This wing tip portion, or winglet 40, assists to reduce wing tip vortices.

Again referring to FIG. 2, a proximal side of each winglet 40 is connected to the connecting member 42 which joins the adjacent forward wing 20 and rearward wing 30. A further connecting member 42 joins the adjacent forward wing 22 and rearward wing 32 on the opposing side of the fuselage.

Each of the forward wings 20, 22 and the rearward wings 30, 32 has a fixed leading edge 25, 35. The leading edge 25, 35 has a curved profile, in the form of a portion of an aerofoil. The leading edge does not rotate or otherwise move.

Figure 11A:
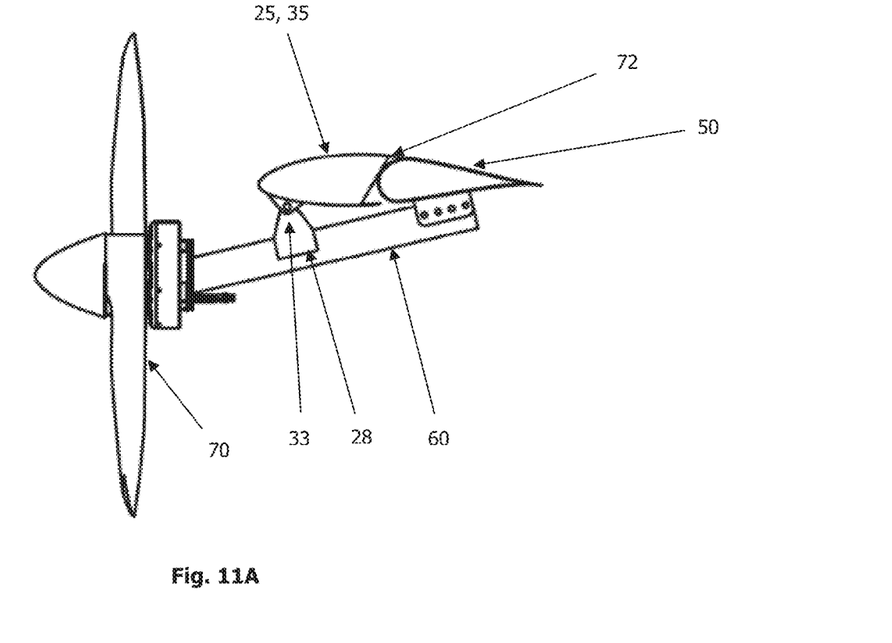
FIG. 11A is a schematic side view showing a mounting arrangement for mounting an electric motor to a wing of the aircraft of any one of FIGS. 7 to 10 with the rotor in horizontal (forward flight) position.
Figure 11B:
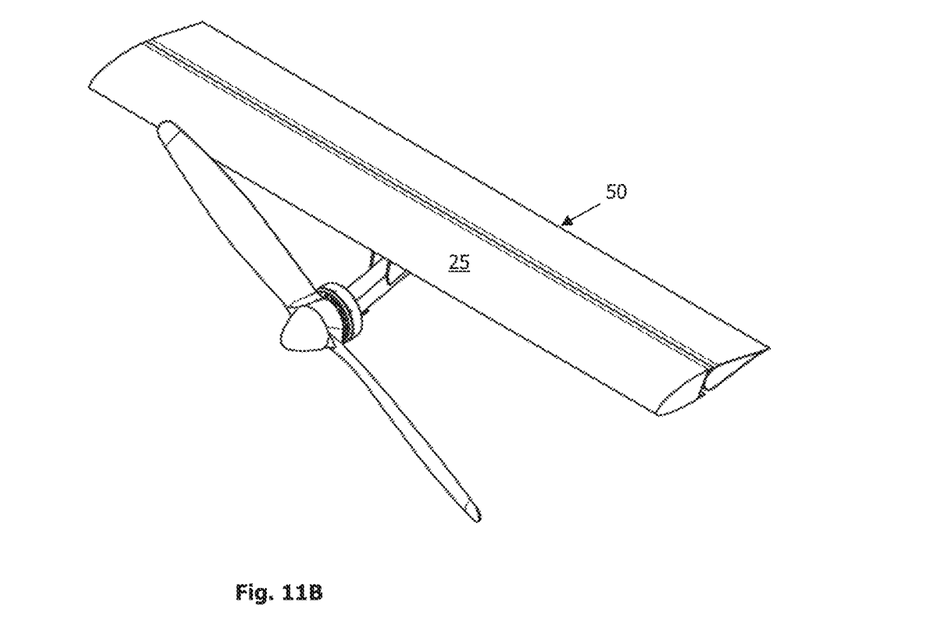
FIG. 11B is a perspective view of the mounting arrangement of FIG. 11A.
Figure 11C:
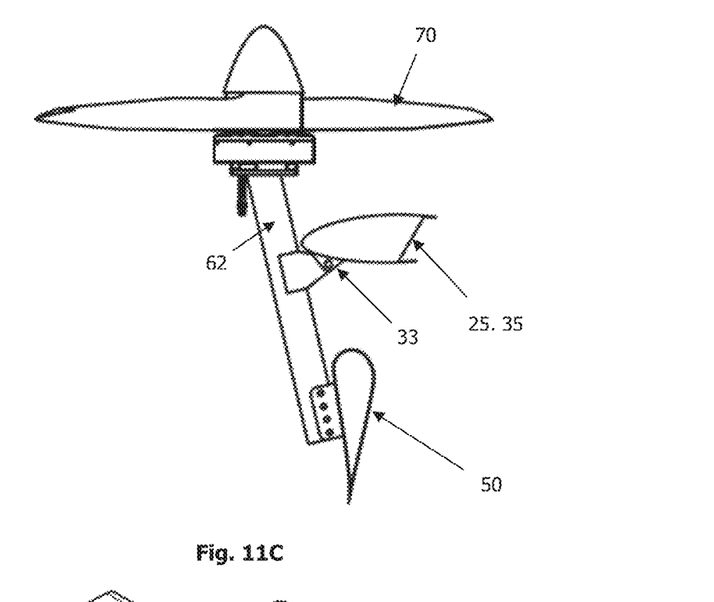
FIG. 11C is a schematic side view showing a mounting arrangement for mounting an electric motor to a wing of the aircraft of any one of FIGS. 7 to 10 with the rotor in a vertical (take-off and landing) rotor position.
Figure 11D:
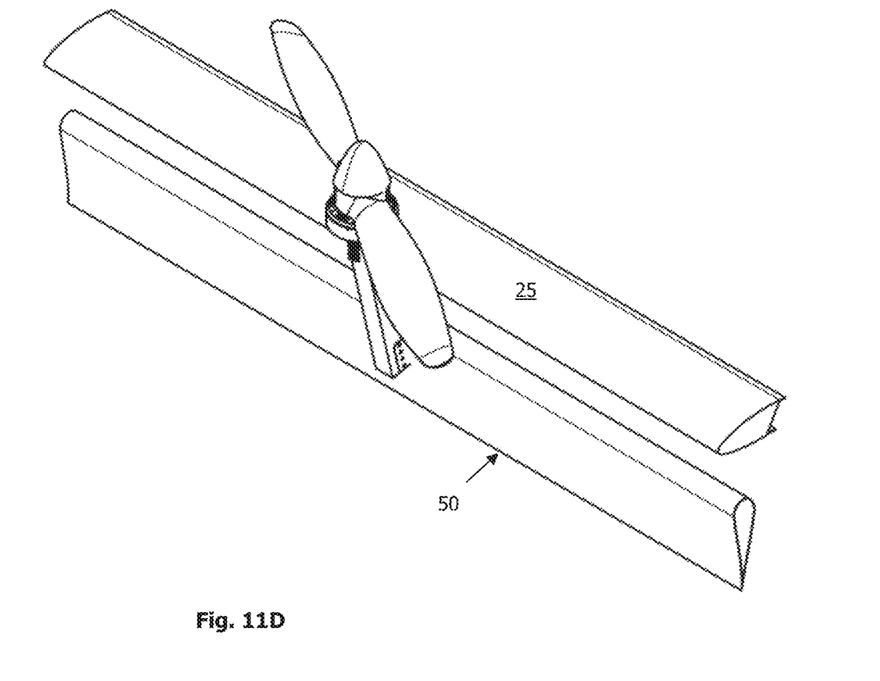
FIG. 11D is a perspective view of the mounting arrangement of FIG. 11C.
Figure 12A:
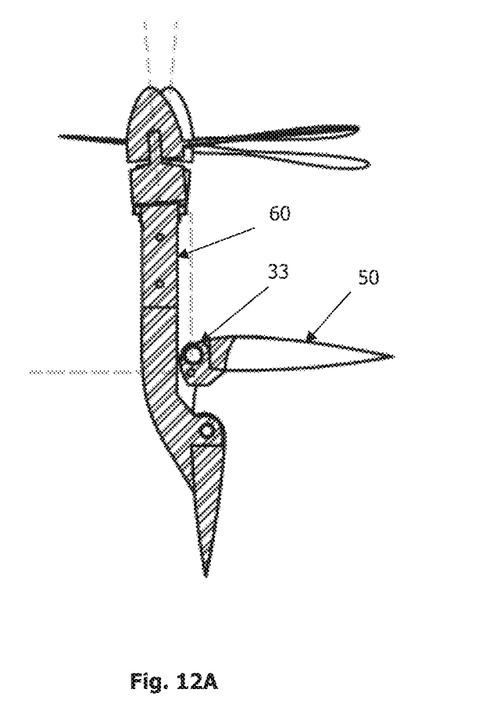
FIG. 12A to 12D are schematic cross-sectional views depicting the transition between vertical and horizontal for the wing arrangement of the aircraft of any one of FIGS. 7 to 11.
Figure 12B:
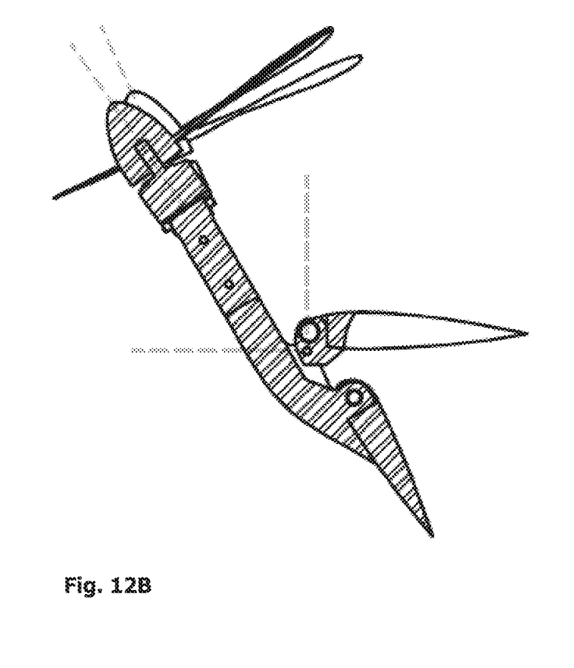
Figure 12C:
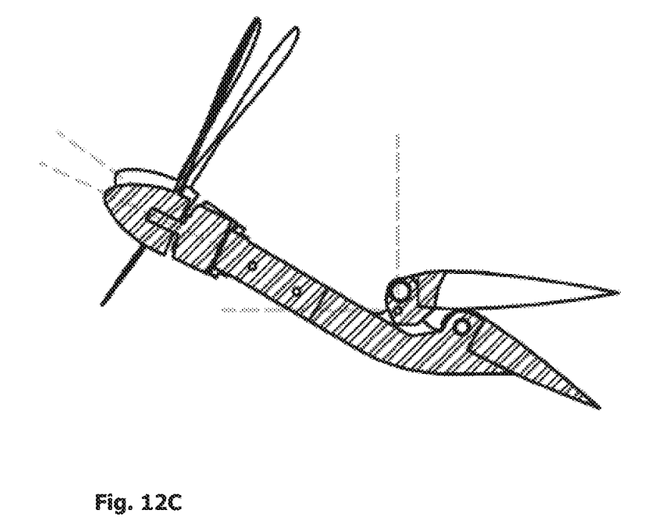
Figure 12D:
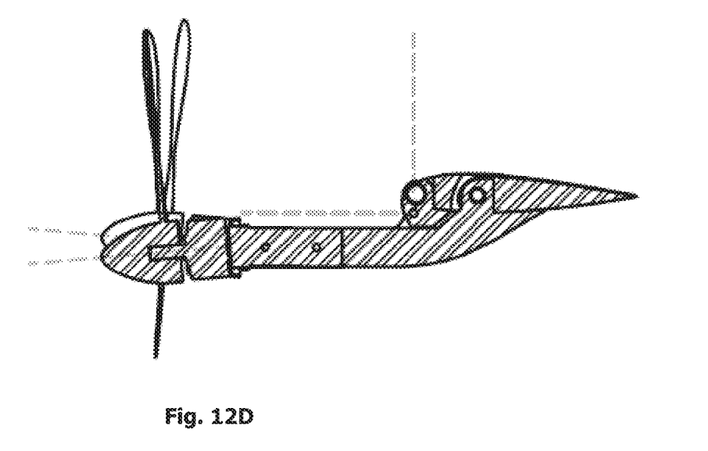

On the trailing side of each fixed leading edge 25, 35, the forward wings 20, 22 and/or the rearward wings 30, 32 have a pivotally mounted aileron or control surface 50. Each control surface 50 is pivotal between a generally vertical configuration for take-off and landing (as depicted in FIG. 11C, 11D) and a generally horizontal configuration for forward flight (as depicted in FIG. 11A, 11B).

The control surface 50 may be a single surface which extends continuously along the full length of the wing 20, 22, 30, 32. Alternatively, each wing 20, 22, 30, 32 may have one or more independently pivotal control surfaces 50, such that the control surfaces 50 are capable of pivoting about the leading edge 25, 35, independent of the other control surfaces 50.

Figure 1:
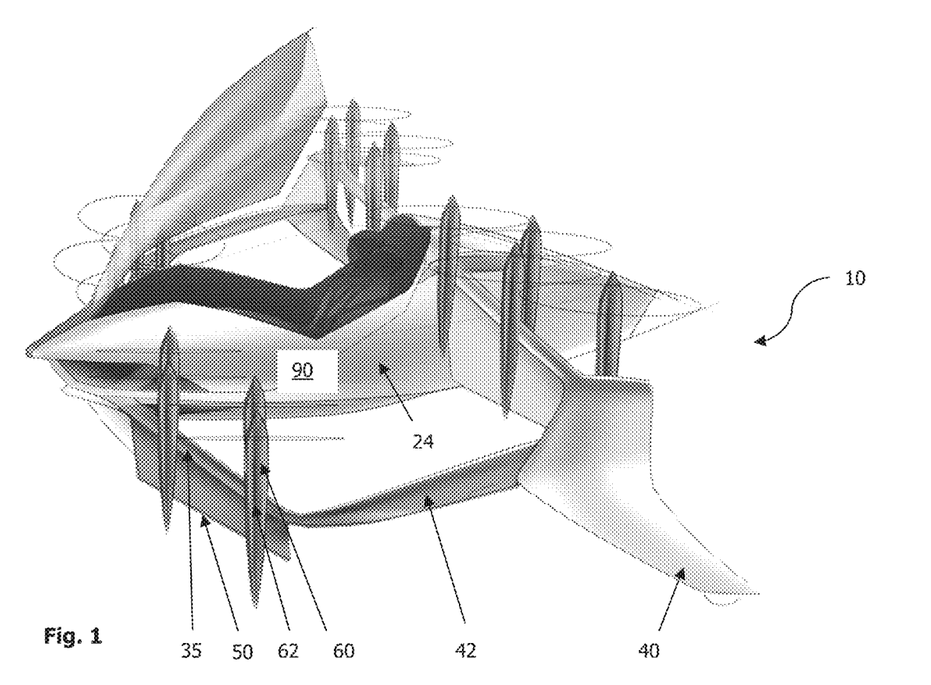
FIG. 1 is a schematic diagram depicting the vertical take-off and landing (VTOL) aircraft of the present invention in a take-off and landing configuration.

The vertical take-off and landing (VTOL) aircraft 10 includes a plurality of electric motors 60. Each motor 60 has a propeller or rotor 70. As depicted in the figures, the body portion 62 of each motor 60 is mounted adjacent to the upper surface or the lower surface of the moveable control surface 50, generally in front of the fixed leading edge 25, 35. The control surface 50 is able to rotate though a range of between about 80 and 100 degrees, and preferably approximately 90 degrees for both horizontal flight mode (FIG. 2) and vertical flight mode (FIG. 1).

The motors 60 may be mounted sufficiently forward of the fixed leading edge 25, 35 so that the rotor blades can fold rearwardly and remain clear of the wing structure.

There are two possible mounting arrangements for the motors 60 and control surface 50:

a) Each motor 60 may be pivotally connected to one of the fixed leading edges 25, 35, and the control surface 50 is secured to the body portion 62 of the motor 60 (for example FIG. 11C); or b) The control surface 50 may be pivotally connected to one of the fixed leading edges 25, 35, and the control surface is secured to the body portion 62 of the motor 60.

The electric motors 60 are each pivotal about the leading edge 25, 35 with the control surfaces 50 between a first position in which the rotor of each motor 60 has a generally vertical axis of rotation, and a second position in which each the rotor of each motor 60 has a generally horizontal axis of rotation.

Figure 14:
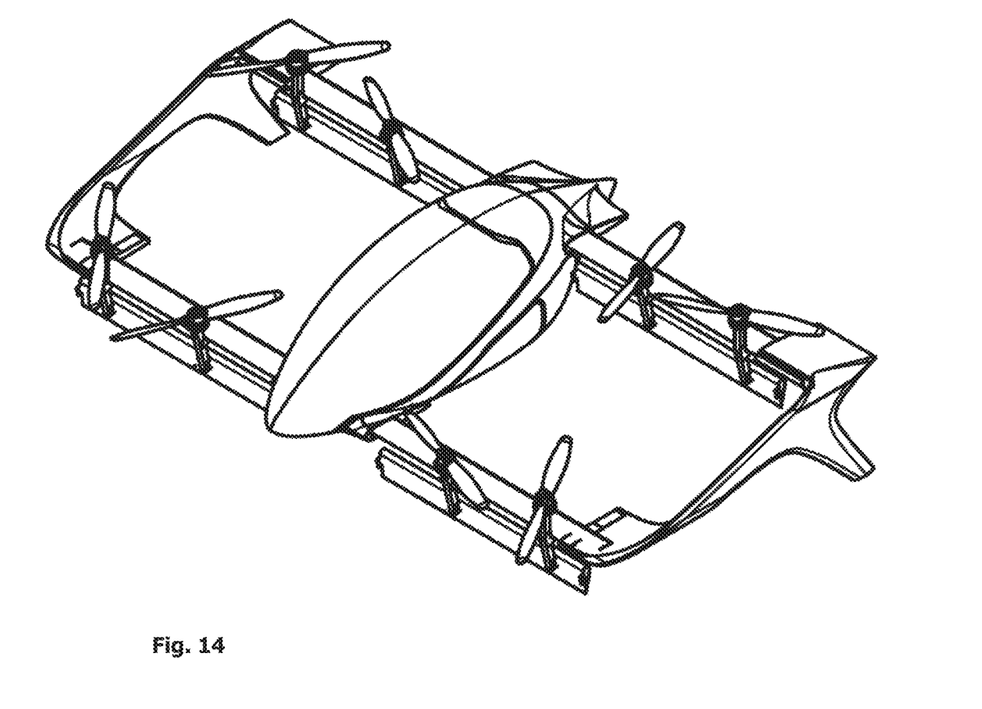
FIG. 14 is a perspective view of an eight rotor vertical take-off and landing (VTOL) aircraft of the present invention in a take-off and landing configuration.
Figure 15:
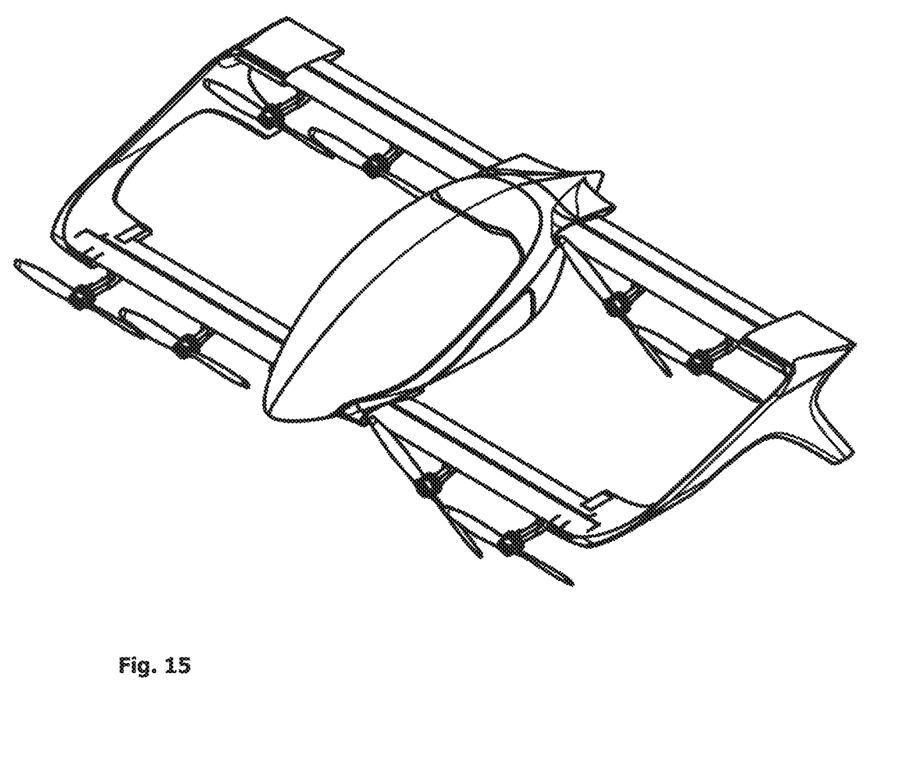
FIG. 15 is a perspective view of an eight rotor vertical take-off and landing (VTOL) aircraft of the present invention in a forward flight configuration.

In the embodiment depicted in FIGS. 1 to 6, at least one of the wings 20, 22, 30, 32 has a first and a second motor 60 which are offset relative to each other about a plane passing through the control surface 50. In the embodiment shown in the drawings, this is achieved by locating the motors 60 on opposing upper and lower sides of the wing 20, 22, 30, 32. In the embodiment depicted in FIGS. 1-6, each wing has four electric motors 60. Namely two electric motors 60 mounted above the wing 20, 22, 30, 32 and two electric motors mounted below the wing 20, 22, 30, 32, in an alternating configuration. However, in the embodiment depicted in FIGS. 14 and 15, each wing has two electric motors 60.

The electric motors 60 and their mounting pylons are each mounted to the pivoting control surface 50. All of the motors rotate about a hinge point 33. The four motors 60 are mounted with different thrust lines. In particular, two of the motors 60 have a thrust line that tends to rotate the control surface 50 horizontally, and other two motors have a thrust line that tends to rotate the wing 20, 22, 30, 32 vertically. When all four motors 60 operate in unison the moments cancel out, and stabilisation is achieved in the vertical flight mode.

The sequence of wing adjustment, depicted in FIGS. 3 to 6, shows the change of inclination of the motors 60 and control surface 50 when transitioning between the take-off wing position and the forward flight wing position. As shown in those figures, the leading edges 25, 35 are stationary, and non-pivoting. In contrast, the motors 60 and control surfaces 50 pivot in unison.

Figure 6:
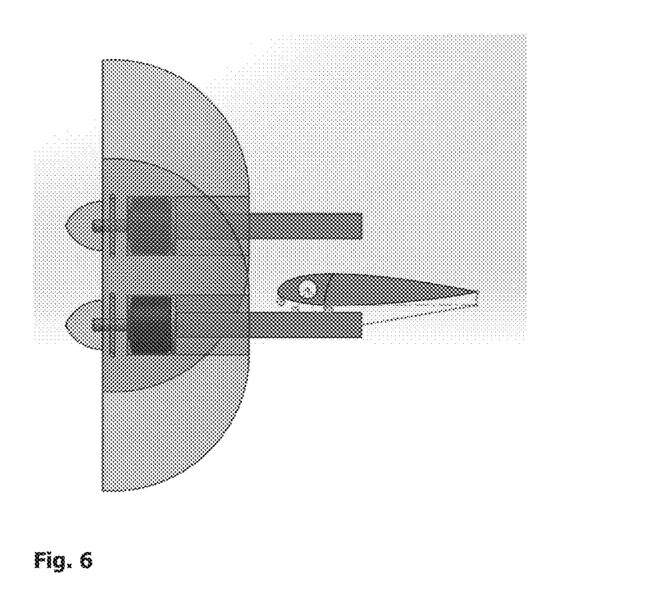
FIG. 6 is a is a further schematic view of the arrangement of FIG. 3 with the rotor in horizontal (forward flight) position.

Referring to FIG. 6, when the wing reaches the final, horizontal position, for forward flight, the engagement between the leading edges 25, 35 and the control surfaces 50 prevents the wing 20, 22, 30, 32 from pivoting further. This occurs because the wing 20, 22, 30, 32 and control surface 50 have complimentary engagement surfaces.

A second embodiment of the invention is shown in FIGS. 7 to 10. In this embodiment, the four motors 60 are each mounted below the wings 20, 22, 30, 32. In particular, each motor 60 is hingedly secured to a location below the wing 20, 22, 30, 32, which can be used to create a leading edge slot 72, that further increases the coefficient of lift and reduces buffet at high angles of tilt, in descent.

The leading edge slot 72 is the gap between the leading edges 25, 35 and the tilting control surface 50. The slot 72 can be seen in FIGS. 3, 4 and 5 and is in the closed position in FIG. 6. It can also be seen in FIG. 11A.

Figure 8:
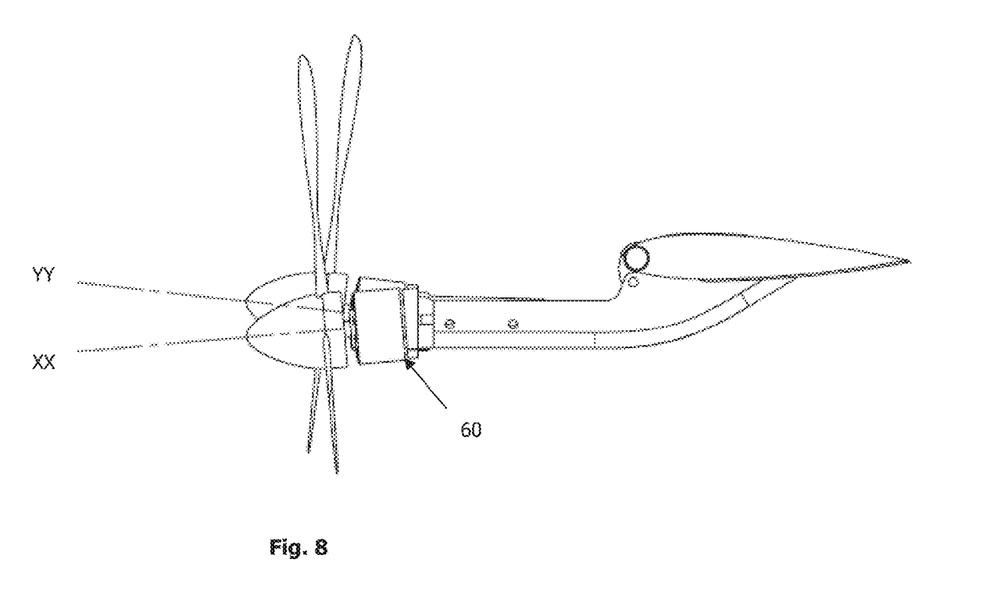
FIG. 8 is a side view of the wing arrangement of FIG. 7.
Figure 9:
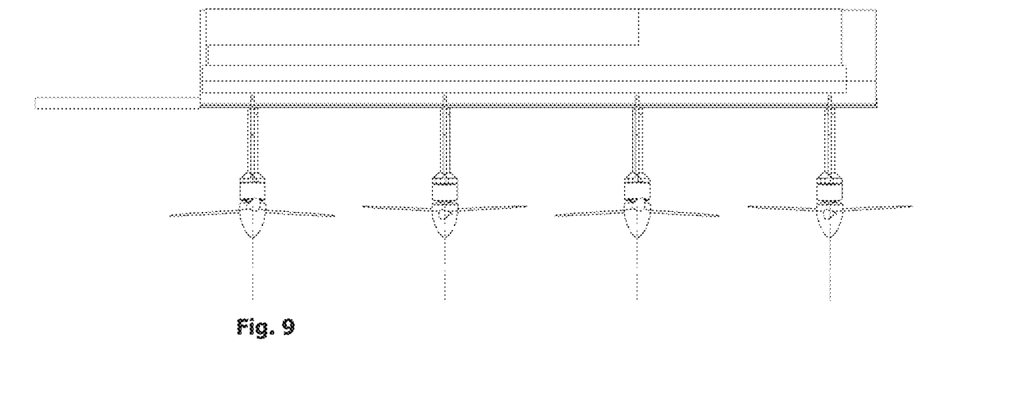
FIG. 9 is a top view of the wing arrangement of FIG. 7.

Referring to FIG. 8, in this arrangement the axes of rotation of the motors are non-parallel. In particular, each odd motor 60 has an axis of rotation XX which is downwardly inclined relative to the control surface 50, and each even motor 60 has an axis of rotation YY which is upwardly inclined relative to the control surface 50. In this manner, two of the motors 60 have a thrust line that tends to rotate the control surface 50 clockwise, and other two motors have a thrust line that tends to rotate the control surface 50 counter-clockwise. When all four motors 60 operate in unison the moments cancel out, and stabilisation is achieved in the vertical flight mode.

The aircraft 10 provides a separately regulated power supply to each motor 60. This permits a different voltage to be delivered to each motor, and hence variable power output can selectively be generated by each motor to achieve desired flight conditions such as turning left and right.

Furthermore, the independent power of the motors 60 enables the motors 60 to be used to tilt the control surface 50 located on the trailing edges of the wings 20, 22, 30, 32.

FIGS. 11A to 11D are schematic views of a motor 60 mounted to the underside of one of the wings 20, 22, 30, 32. A hinge plate 28 is connected to the fixed leading edge 25, 35, and extends downwardly. The motor 60 is pivotally connected to the hinge plate 28 at the hinge point 33. The propeller 70 and pylon structure is fixed to the control surface 50, which rotates about the hinge point 33.

In this embodiment, having wing underside mounted motors 60, the sequence of wing adjustments depicted in FIGS. 11A to 11D shows the change of inclination of the motors 60 and control surfaces 50 when transitioning between the vertical take-off wing position and the horizontal forward flight wing position. In the same manner as the first embodiment, the leading edges 25, 35 are stationary, and non-pivoting, and the motors 60 and control surfaces 50 pivot in unison.

FIGS. 12A to 12D are schematic cross-sectional views depicting the transition between vertical and horizontal for the wing arrangement of any one of FIGS. 7 to 11D. FIGS. 12A to 12D also depict that the thrust lines of the adjacent motors on each wing being non-parallel, which results in the moment about the hinge point 33, which can be selectively used to rotate to control surfaces 50.

In the preferred embodiments depicted in the drawings, there are two or four motors 60 mounted to each wing 20, 22, 30, 32. However, additional motors 60 may be mounted to the aircraft 10, for example on the wings 20, 22, 30, 32, the nose of the fuselage 24 or the wing connecting members 42.

In one embodiment, the hinge mechanism can be integrated into the motor pod structure further reducing structural weight. A further possible improvement is that when there are multiple motor pods, each pod houses a hinge bearing.

Figure 10:
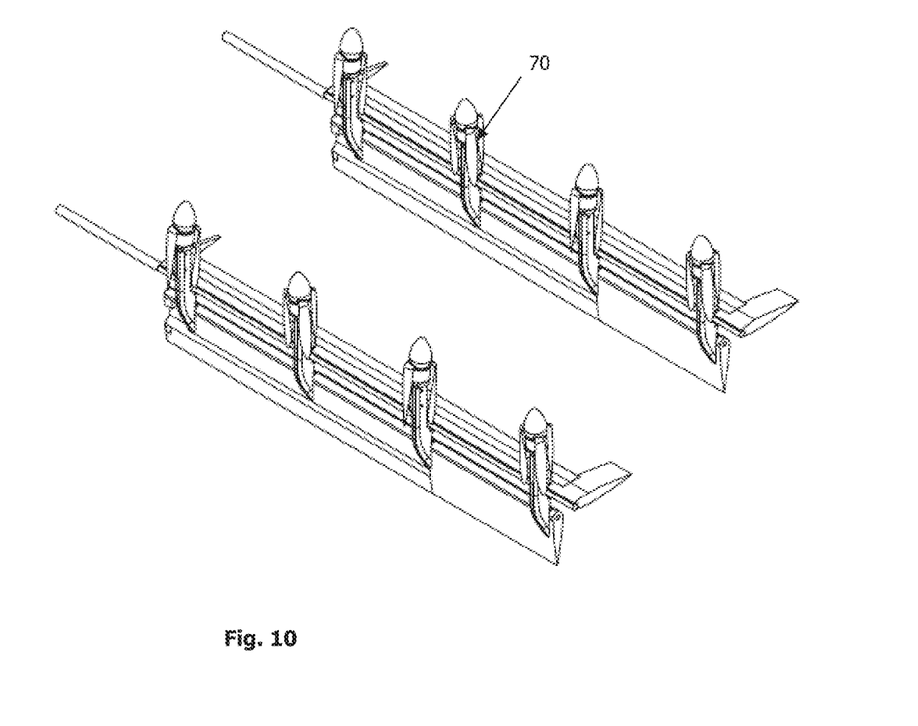
FIG. 10 is a perspective view of the wing arrangement of FIG. 7, with the rotor blades stowed.

Referring to FIG. 10, the rotor 70 blades of the motors 60 may fold downwardly when not in use. Furthermore, some of the rotor blades 70 may fold downwardly and rearwardly when in forward flight mode, as less propulsion power is normally required in forward flight mode as compared to take-off and landing.

Figure 7:
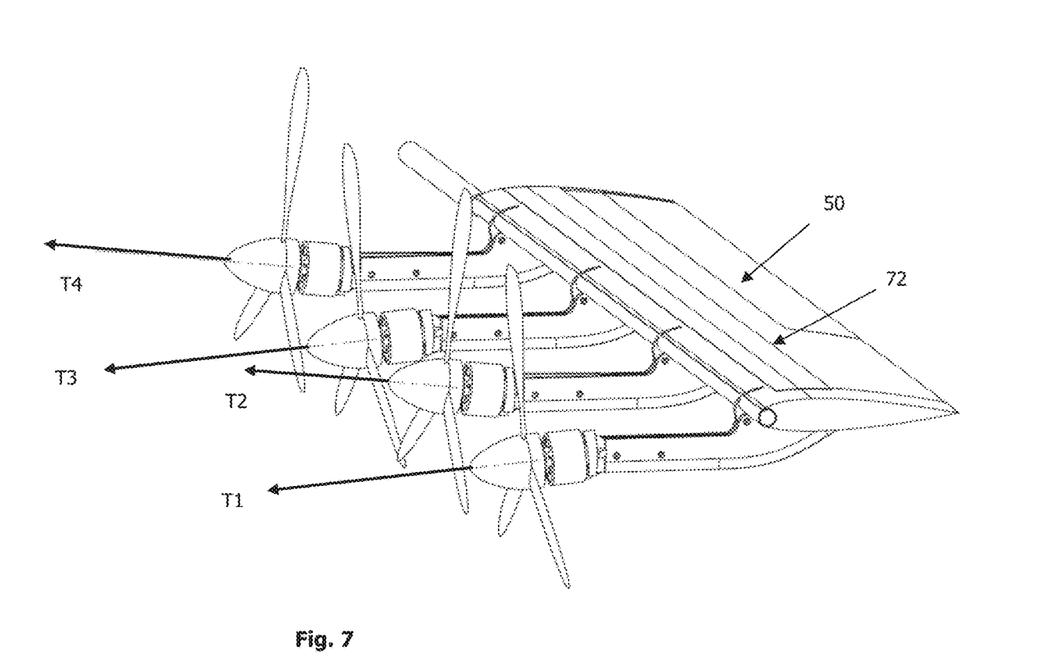
FIG. 7 is a perspective view depicting a further embodiment of the VTOL aircraft.

Conventional tilt wing aircraft require an actuator to tilt the wing. In contrast, the embodiments of the VTOL aircraft 10 disclosed herein use motor thrust to rotate the control surfaces 50. This is achieved by either having the motors mounted on both sides of the wing tilt axis (i.e. above and below the wing), or alternatively having some motors angularly inclined relative to the other motors to achieve different, angularly offset thrust lines, as shown in FIG. 7. The operation will be described below.

The motors 60 are preferably brushless DC motors which change speed by changing the switching frequency. This switching frequency is controlled by electronic speed controllers (ESC) in the control system 90. The motors 60 are actually permanent magnet AC motors, but the input from the ESC is DC so they are commonly referred to as brushless DC). The motor 60 operation is such that higher frequency input from the ESC results in higher propeller speed, and lower frequency input from the ESC results in lower propeller speed.

In practice, if the switching frequency is equal, moments will be balanced.

First Embodiment—Motors Mounted Above and Below the Wings

Referring to the embodiment depicted in FIGS. 1 to 6, by increasing the rotational speed of the electric motors 60 located above the control surfaces 50 of the wing, the control system is able to increase the thrust produced by the upper propellers 70. Simultaneously, reducing the speed of the motors 60 located beneath the control surfaces 50 of the wing reduces the thrust produced by the lower propellers 70. The result is a turning moment that rotates the control surfaces 50 to the generally horizontal, forward flight mode.

In contrast, by decreasing the speed of the electric motors 60 located above the control surfaces 50 of the wing and increasing the speed of the electric motors 60 located beneath the control surfaces 50 of the wing, the result is a turning moment that rotates the control surfaces 50 to the vertical (take-off and landing) configuration.

The motors 60 are controlled using mixing algorithms in the control software that ensure the total output of all motors 60 on that segment of wing produce the total thrust required for stable flight, yet are able to tilt the wing from vertical to horizontal and back as commanded.

A brake or clamping device or small actuator is used to hold the control surfaces 50 in the desired vertical or horizontal configuration.

Second Embodiment—Motors Mounted with Angular Thrust Vector Offset

Referring to the embodiment depicted in FIGS. 7 to 13, by increasing the rotational speed of the electric motors 60 having downwardly inclined thrust lines XX, the control system is able to increase the thrust produced by the upper propellers 70. Simultaneously, reducing the speed of the two motors 60 having upwardly inclined thrust lines YY, reduces the thrust produced by those propellers 70. The result is a turning moment that rotates the control surfaces 50 to the generally horizontal, forward flight mode.

In contrast, by decreasing the speed of the electric motors 60 having downwardly inclined thrust lines XX, and increasing the speed of the electric motors 60 having upwardly inclined thrust lines YY, the result is a turning moment that rotates the control surfaces 50 to the vertical (take-off and landing) configuration.

A further embodiment of the aircraft 10 has 4, 6 or 2n (n=1,2,3,4 motors 60 per control surfaces 50 such that the tilt mechanism has redundancy, so that any single motor failure does not prevent wing rotation.

Advantageously, the embodiments of the aircraft 10 remove the need for large or heavy actuators to rotate the wing of a tilt wing configuration aircraft 10. There is also potentially a reduction in the number of components, thereby increasing system reliability.

Figure 13:
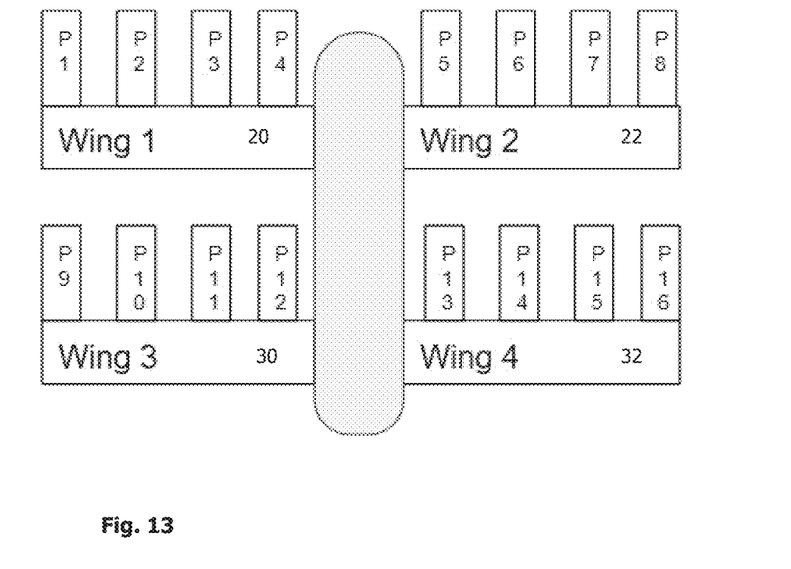
FIG. 13 is a schematic view of the electric motor mounting arrangement of either of the first and second embodiments.

An example will now be described. Referring to FIGS. 7 and 13, the embodiment shown has four motors 60 per wing 20, 22, 30, 32, and sixteen motors 60 in total.

$T_1$=Thrust of Prop & motor 1 ($P_1$)
$T_2$=Thrust of Prop & motor 2 ($P_2$)
$T_n$=Thrust of Prop & motor n ($P_n$)
$T_{16}$=Thrust of Prop & motor 16 ($P_{16}$)

When the motors 60 are in the vertical axis configuration (for example FIG. 12A) the total hover thrust=$T_1+T_2+T_3+\ldots+T_{16}$ For balanced hover Weight=mass*g (acceleration due gravity)

$$W=T_1+T_2+T_3+\ldots+T_{16}$$

The thrust generated by each motor 60 can be changed by the control system by increasing or decreasing the speed of each propeller 70, achieved by sending a signal to the Motor Electronic Speed Controller (ESC) that increases or decreases the rotational speed of the motor 60. Alternatively variable pitch propellers can be used and thrust is changed by varying the pitch on the propeller.

Thrust on Wing 1=$T_{w1}=T_1+T_2+T_3+T_4$
Thrust on Wing 2=$T_{w2}=T_5+T_6+T_7+T_8$
Thrust on Wing 3=$T_{w3}=T_9+T_{10}+T_{11}+T_{12}$
Thrust on Wing 4=$T_{w4}=T_{13}\pm T_{14}+T_{15}+T_{16}$
In steady state hover:

$$W=T_{w1}+T_{w2}\pm T_{w3}T_{w4}$$

Using conventional multirotor stabilisation algorithms, the speed of each motor 60 is varied to stabilise against disturbances and differential thrust is used to pitch and roll the aircraft 10.

In the hovering mode, the wings 20, 22, 30, 32 may be free or clamped using another mechanism.

Advantageously, the aircraft 10 permits smaller distributed hinge bearings for each motor 60, which can be redundant, and of a much smaller diameter (therefore lighter).

The invention can provide a slotted leading edge that dramatically reduces buffet experienced by tilt wing aircraft during descent.

Additional electric motors (not shown) may be mounted to structures other than the wings, such as the fuselage, in order to generate additional lift force and/or for speed.

Advantageously, a box wing structure is more aerodynamically efficient than a conventional wing of the same size and can be more structurally efficient (therefore lighter).

Advantageously, the boxed wing structure provides additional rigidity.

Advantageously, the aircraft 10 reduces the weight of the bearings and tilt structure required when compared to a conventional tilt wing aircraft. This is because a conventional tilt wing requires a single large bearing pair (one on either side of the aircraft fuselage) with stiff structure that rotates.

Although the invention has been described with reference to specific examples, it will be appreciated by those skilled in the art that the invention may be embodied in many other forms.

The invention claimed is:

1. A vertical take-off and landing (VTOL) aircraft comprising: a fuselage; first and second forward wings mounted to opposing sides of the fuselage, each wing having a fixed leading edge and a trailing control surface which is pivotal about a generally horizontal pivot axis; the first and second forward wings each having first and second electric motors, the first and second electric motors each having rotors, the motors being mounted to each wing, the rotors being pivotal with a common trailing control surface between a first position in which each rotor has a generally vertical axis of rotation, and a second position in which each rotor has a generally horizontal axis of rotation, a control system for controlling each motor; wherein the control system is configured to selectively operate the first electric motor and the second electric motor of each wing at different rotational speeds to generate a turning moment to pivot the respective control surface about the pivot axis.

2. The vertical take-off and landing (VTOL) aircraft of claim 1, wherein a thrust line of the first electric motor is angularly offset relative to a thrust line of the second electric motor.

3. The vertical take-off and landing (VTOL) aircraft of claim 1, wherein the first electric motor has a rotor located above the control surface, and the second electric motor has a rotor located below the control surface, such that a thrust line of the first electric motor is generally parallel to and offset relative to a thrust line of the second electric motor.

4. The vertical take-off and landing (VTOL) aircraft of claim 1, wherein the first motor is operated by the control system at a higher rotational speed than the second motor responsive to a command to move the control surface between the first position and the second position, further wherein the first motor is operated by the control system at a lower rotational speed than the second motor responsive to a command to move the control surface between the second position and the first position.

5. The vertical take-off and landing (VTOL) aircraft of claim 1, wherein each wing has at least two electric motors each having rotors, the rotors being arranged in pairs having thrust lines which cancel any turning moment when the pair of motors rotate at generally equal rotation rates.

6. The vertical take-off and landing (VTOL) aircraft of claim 1, wherein in a hovering mode, the control system is configured to rotate each motor at a suitable speed to generate a combined thrust force of all motors equal to a total aircraft and payload mass multiplied by gravitational acceleration.

7. The vertical take-off and landing (VTOL) aircraft of claim 1, further including a brake, actuator or clamping device to hold the control surface in the desired first and second positions.

8. The vertical take-off and landing (VTOL) aircraft of claim 7, wherein the brake or clamping device is operated by the control system.

9. The vertical take-off and landing (VTOL) aircraft of claim 1, further comprising first and second rearward wings mounted to opposing sides of the fuselage, wherein a distal portion of each forward wing, furthest from the fuselage, is connected to a distal portion of the adjacent rearward wing with a connecting member, defining a boxed wing structure.

10. A vertical take-off and landing (VTOL) aircraft comprising: a fuselage; first and second forward wings mounted to opposing sides of the fuselage, each wing having a fixed leading edge and a trailing control surface which is pivotal about a generally horizontal pivot axis; the first and second forward wings each having a first electric motor having a first variable pitch propeller, a second electric motor having a second variable pitch propeller, the first and second motors being mounted to each wing, the first and second propellers being pivotal with a common trailing control surface between a first position in which each propeller has a generally vertical axis of rotation, and a second position in which each propeller has a generally horizontal axis of rotation, a control system for controlling rotation speed and/or blade pitch each variable pitch propeller; wherein the control system is configured to change the pitch of the first propeller relative to the second propeller of each wing to generate a turning moment to pivot the respective control surface about the pivot axis.

11. The vertical take-off and landing (VTOL) aircraft of claim 1, wherein the motors are brushless DC motors which change speed responsive to changing switching frequency from electronic speed controllers of the control system.

\* \* \* \* \*